United States Patent [19]

Molinder

[11] Patent Number: 4,477,060
[45] Date of Patent: Oct. 16, 1984

[54] UNDERWATER CUTTING TOOL

[76] Inventor: Lars A. Molinder, Ovre Olskroksgatan 12, S-41667, Goteborg, Sweden

[21] Appl. No.: 513,115
[22] PCT Filed: Oct. 12, 1982
[86] PCT No.: PCT/EP82/00227
  § 371 Date: Jun. 13, 1983
  § 102(e) Date: Jun. 13, 1983
[87] PCT Pub. No.: WO83/01480
  PCT Pub. Date: Apr. 28, 1983

[30] Foreign Application Priority Data

Oct. 20, 1981 [DE] Fed. Rep. of Germany ....... 3141583

[51] Int. Cl.³ .............................................. B23K 7/00
[52] U.S. Cl. .................................................... 266/48
[58] Field of Search ......................................... 266/48

[56] References Cited

U.S. PATENT DOCUMENTS 3,507,230 4/1970 Seib .
4,050,680 9/1977 Sweeny .
4,182,947 1/1980 Brower .

FOREIGN PATENT DOCUMENTS 7289 1/1980 European Pat. Off. .
2300265 7/1974 Fed. Rep. of Germany .
1002142 3/1952 France .
668393 3/1952 United Kingdom .

Primary Examiner—W. Stallard
Attorney, Agent, or Firm—Roberts & Floyd

[57] ABSTRACT

An underwater cutting tool for steel, concrete, or the like, comprising a tubular oxygen lance (10) adapted to be connected to an oxygen source (24, 25) and having a pistol grip-like handle (16).

Prior to its first use the lance is sealed so as to be ignited safely under water. This seal (12) is adapted to be blasted off or fused by means of an igniter unit (14) which is operable under water, at the same time, firing the oxygen flowing out of the lance (10). The seal (12) preferably is formed by a plug of a material which is easily inflammable or contains such material and hermetically seals the free end of the lance (10).

9 Claims, 5 Drawing Figures

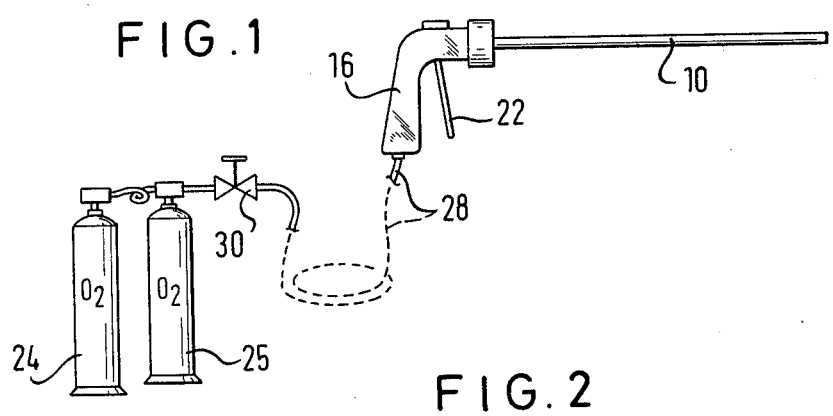
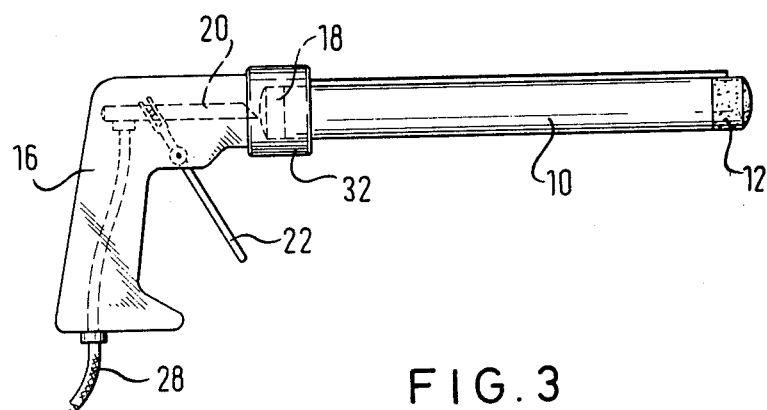
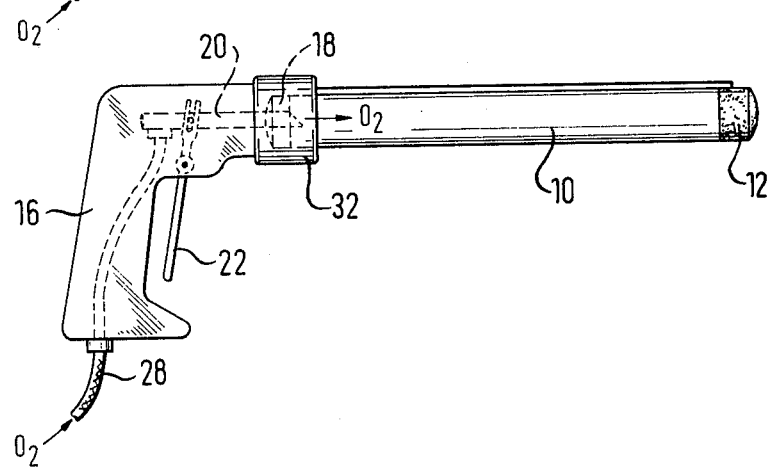

UNDERWATER CUTTING TOOL

The instant invention relates to an underwater cutting tool for steel, concrete, or the like, comprising a tubular oxygen lance adapted to be connected to an oxygen source and having at its one end a pistol grip-like handle or the like and at its other, free end an igniter unit for igniting the oxygen flowing out of the lance.

Such so-called burner bars or thermal lances are used to cut steel and concrete. The diameter of those bars or lances is approximately ⅜". However, lances having smaller or greater diameters are used as well (e.g. ½" and 1").

The conventional thermal lances (cf. e.g. U.S. Pat. Nos. 4,050,680 and 4,055,322) normally are used only above water. However, under certain conditions they may be employed under water too, although in shallow waters only as they must be ignited above the water surface in order to be brought to the job site by a diver. This premature igniting above the water level causes substantial loss of oxygen. Loss of oxygen, however, is nothing to worry about, since it is rather inexpensive. However, a considerable length of lance is consumed on its way down to the diver. Loss of lance is critical since it means loss of time. Furthermore, the risk of the diver becoming injured is very great. The maximum working depth of the known thermal lances is about 30 m.

It is another disadvantage of the known designs that igniting the torches above water means that the diver must carry the entire apparatus to the place where the work is to be done. In this connection please note that normally all the oxygen cylinders are on the surface and never put under water. The battery is also normally kept on the surface. For deep-water applications, however, it is obvious that the gas bottles should be brought to the worksite under water and the ignition should take place under water. This apparatus is rather heavy and cumbersome to handle as it includes not only the lance or bar but also oxygen cylinders, oxygen hoses and corresponding valves. In the case of a lance to be ignited electrically, the weight of the battery must be considered in addition.

It is, therefore, the object of the invention to provide an underwater cutting tool of the kind specified initially which is ignitable safely under water, even in greater depths, thereby avoiding the above mentioned disadvantages of the conventional underwater cutting tools or torches.

This object is met in surprisingly simple manner, in accordance with the invention, in that before being made use of, the lance is sealed to be water-tight, the seal being adapted to be blasted off or fused under water by the igniter unit upon simultaneous ignition of the oxygen flowing out of the lance.

Before igniting the lance, the whole apparatus can be transported to the place of work. There is no hazard for the diver by an ignited lance. The sealing of the lance in accordance with the invention prevents water from entering into it before the seal has been removed by igniting the igniter unit. The seal preferably is so dimensioned that it will withstand the water pressure down to a depth of 400 m. Additionally the seal and the lance itself are to resist internal elevated pressure of 5 to 10 bars as compared to the external water pressure, caused by the burner gas, preferably oxygen flowing into the lance.

A particularly advantageous structure is characterized in that the seal is formed by a plug which tightly seals the free end of the lance and is made of a material which is easily inflammable or contains such a substance. The priming or firing substance preferably is iron thermite.

In another structural further development the lance is sealed also at the end adjacent the pistol grip. This seal is adapted to be opened mechanically so that oxygen may flow into the lance at a predetermined or preadjusted elevated pressure as compared to the external water pressure. The seal at the end adjacent the pistol grip is opened before the seal is removed which closes the free end of the lance. As regards the structural embodiment of the opening mechanism for the seal at the end adjacent the pistol grip, reference is made to claims 4 and 5.

If an electrical igniter is used, preferably an electrical switch is provided at the pistol grip for igniting the igniter unit. In an especially simple embodiment the electrical switch is adapted to be actuated by the trigger to which the needle is coupled which pierces the seal at the end adjacent the pistol grip. Actuation thereof takes place subsequent to the opening of the seal at the end adjacent the pistol grip. Thus when actuating the trigger, first the seal at the end adjacent the pistol grip is pierced so that oxygen may flow into the lance at elevated pressure. Upon further movement of the trigger toward the pistol grip, the electrical switch is actuated firing the electrical igniter unit coupled to the same. This not only blows off or melts the seal closing the free end of the lance but at the same time also ignites the combustible gas (oxygen) flowing out of the lance. It is not the oxygen that burns. The preigniter of iron thermite creates a zone with molten metal at the end of the lance. As the oxygen passes, it rapidly oxidizes the metal. The surplus heat from this reaction melts new metal from the lance which thus helps to maintain the reaction until the lance is completely consumed. This structural embodiment consequently is characterized by stepwise operation. For reasons of safety (safety regulations) it is also possible to provide a separate actuating lever or knob (push button).

The electrical igniter unit preferably used comprises an igniter which has at least one heater filament sheathed by a firing substance, preferably iron thermite. An igniter of this type is fixed to the inside of the seal at the free end of the lance or embedded in the same, the electrical connections to the electrical switch passing either along the outside or the inside of the lance. The electrical terminals are coupled electrically to the ignition switch mentioned above which in turn is connected electrically to a power source (battery). The battery preferably is housed in the pistol grip of the lance.

The heater filament used may be the filament of an ordinary incandescent lamp of 2.4 V. Then a battery of 5 volts/1.5 amperes will be sufficient to fire the igniter unit.

In the making of the igniter, the heater filament is brushed several times with thermite of which a slurry has been prepared previously with alcohol. When the thermite coating of the heater filament has reached a layer thickness of 4 to 5 mm, it is dried carefully. Subsequently the surface is spray-coated with plastic varnish to render it hard and insensitive. The heater filament is coated with varnish prior to applying the thermite so as to prevent short-circuiting during thermite application.

The igniter unit described above need not be embedded fully in the seal. It may be sufficient to have it embedded in part only in the seal or merely attached to the inside of the seal.

Instead of using an electrical igniter unit a priming composition or igniter unit may be employed which is easily ignitable by a chemical reagent, such as concentrated sulphuric acid. The igniter unit then comprises a substance, for instance, a potassium chloride sugar mixture which is ignited upon contact with the chemical reagent, whereby adjacent thermite is ignited and finally the entire seal is blasted off or fused.

The chemical reagent is not contacted with the firing substance until oxygen or the like has flowed into the lance.

In a structural embodiment the chemical reagent preferably is disposed in a thin glass bubble or the like at the inside of the seal closing the free end of the lance. The glass bubble is broken by the incoming oxygen causing elevated pressure in the lance. Thereby the reagent contacts the firing substance disposed at the respective location at the inside of the seal. The glass bubble may be embedded partly in the seal, the embedded portion being surrounded by the inflammable substance, e.g. a potassium chloride sugar mixture and by a thermite layer.

The thermite is selected in accordance with the seal to be blasted or fused away. Preferably iron thermite is chosen whose reaction will take place as follows:

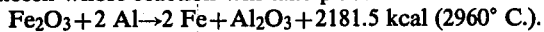
$Fe_2O_3 + 2 Al \rightarrow 2 Fe + Al_2O_3 + 2181.5$ kcal (2960° C.).

The invention will be described further, by way of example, with reference to the accompanying drawings, in which:

FIG. 1 is a general view of the cutting apparatus;

FIG. 2 is a side elevational view of the thermal lance according to the invention before it is made use of;

FIG. 3 shows the thermal lance according to FIG. 2 upon piercing of the inner seal;

Figure 4:
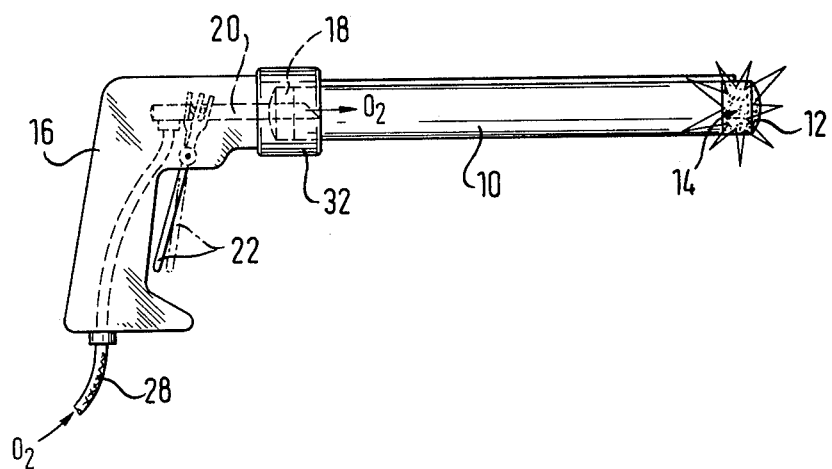
FIG. 4 shows the thermal lance upon ignition of the outer seal.

The underwater cutting tool as illustrated in FIG. 1 comprises not only a thermal lance 10 having a handle in the form of a pistol grip 16 but also two oxygen cylinders 24, 25, a connecting hose 28 between the oxygen cylinders and the thermal lance 10, and a pressure reducing valve 30. The arrangement shown diagrammatically in FIG. 1 is known per se.

Figure 5:
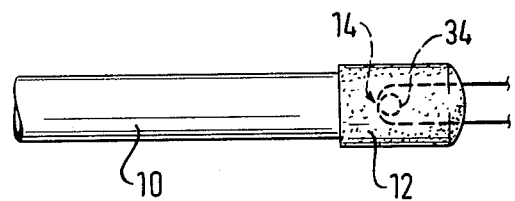
FIG. 5 shows part of the thermal lance including details of the igniter unit at the seal closing the free end of the lance.

FIGS. 3 to 5 show the thermal lance 10 designed according to the invention in greater detail. The lance 10 is tubular and provided at one end with a handle in the form of a pistol grip 16. The other end of the tubular lance 10 is closed by a seal 12. Also the end of the lance 10 adjacent the pistol grip is sealed or closed (seal 18). The tubular lance 10 is secured to the pistol grip 16 by means of a conventional chuck 32. Of course, the connection must be made fluid-tight. The oxygen connecting hose 28 is connected to the pistol grip 16. Upon breaking of the inner seal 18 at the end adjacent the pistol grip 16 oxygen at positive pressure of 5 to 10 bars as compared to the surrounding water pressure is introduced by way of the pistol grip 16 into the tubular lance 10. The inner seal 18 is cancelled by a needle 20 supported in the pistol grip 16 for displacement in longitudinal direction of the lance, the needle 20 preferably being tubular, i.e. formed with an axial passage for the oxygen. With this design the hose 28 is connected directly to the end of the needle 20 remote from the seal 18. The needle 20 is displaced in longitudinal direction by means of a trigger 22. When the trigger 22 is moved toward the pistol grip 16, the needle 20 is moved in the direction of the free end of the lance, thereby piercing the seal 18. Thereupon oxygen may flow into the interior of the lance. Subsequently, the seal 12 closing the outer or free end of the lance 10 must be removed and the oxygen ignited which has been introduced into the lance 10. Both are effected by an igniter unit 14 (cf. FIG. 5) installed in the outer seal 12 and ignited electrically in the embodiment shown. The igniter unit 14 comprises a helical heater filament 34 sheathed by iron thermite and embedded in the seal 12, the electrical leads of the heater filament passing to the outside. These electrical terminals are connected in a manner not shown to an electrical switch disposed in the pistol grip and in turn being connected electrically to a battery housed in the pistol grip. The electrical switch and battery likewise are not shown in the figures. When using a conventional heater filament for 2.4 V incandescent lamps (flashlight bulbs) a 5 V/1.5 A battery is sufficient to effect the ignition.

The electrical switch arranged in the pistol grip is coupled to the trigger 22 in such manner that it will be actuated upon piercing of the inner seal 18 as the trigger 22 continues to be moved toward the pistol grip 16. This means that the ignition and consequently the blasting off or fusing of the outer seal 12 and the simultaneous ignition of the oxygen in; troduced into the lance 10 will not take place until the inner seal has been broken or oxygen has been introduced at elevated pressure into the lance 10 (2-step operation). This guarantees safe functioning of the lance.

The ignition of the igniter unit 14 preferably causes no more than softening of the outer seal 12, whereby the latter can be blown off easily by the oxygen which is at positive pressure. At the same time, of course, it must be warranted that the oxygen is ignited as or immediately before the outer seal is blasted off. The continued flow of oxygen then will maintain the reaction.

In preparing the igniter unit, first a heater filament of the type used for flashlight bulbs is provided with electrical terminals in the form of copper wires. Thereupon the heater filament as well as the electrical terminals are provided with an insulating varnish. Subsequently the heater filament is enclosed by an iron thermite mass of which a slurry has been made previously with alcohol. When the thermite sheath has attained a layer thickness of 4 to 5 mm, it is dried carefully. Thereupon the surface of the sheath again is coated with an insulating varnish so as to make it hard and insensitive.

This igniter unit then is fixed to the seal or embedded in the same.

The outer seal may consist in its entirety of a substance which is easily inflammable. However, in that event it is problematic or obtain sufficient pressure resistance of the seal. Usually, an additional outer seal will be required, such as a cap of plastic material cemented to or cast on the free end of the lance 10. Attachment of the plastic cap by an adhesive has proved to be very successful in tests because a suitable glue used (Araldite)* will melt readily as the ignition reaction gets under way. Then it is no problem for the cap to become separated from the lance end.

*Araldite-two components Epoxy-resin

Another embodiment starts from a customary thermal lance in which the torch wires or bars are set back into the interior to such an extent that a free cavity is obtained at the free end of the lance of a length of at least 20 to 30 mm.** Some of the wires are left in place to provide a sufficiently great area of contact with the thermite. This cavity is filled with thermite paste (thermite alcohol mixture). It is important that the paste cures well and fills the lance cavity in question densely packed.

**(e.g. 10 to 15 iron wires and one aluminium wire, wherein the diameter of the iron wires is about 1 mm and the diameter of the aluminium wire is about 2 mm. These wires are burning under the oxygen stream, wherein the lance is used up slowly.)

The igniter (heater filament) is pushed in or pressed into the thermite paste as long as the latter is still moist. Subsequently the free lance end is sealed by a pressure-resistant seal.

In tests also conventional photoflashes which operate mechanically, of the type called magic cubes, have proved to be advantageous ignition means. In that even mechanical ignition is effected of snarled up magnesium wire disposed in a glass container or the like filled with oxygen, for example by an igniter filled with gunpowder, which is ignited by a mechanical stroke and which feeds a blast flame to said snarled up magnesium wire.

What is claimed is:

1. An underwater cutting tool comprising in combination
   (a) a hand-held base portion flexibly connected to an oxygen source;
   (b) a thermal lance attached to said hand-held base portion at one end and having a watertight seal at the opposite cutting end;
   (c) said watertight seal formed of an inflammable material;
   (d) an igniter unit to ignite and blast off said watertight seal at said cutting end;
   (e) said thermal lance sealed at the end opposite the cutting end;
   (f) said hand-held base portion having means to pierce the thermal lance at the end opposite the cutting end to allow oxygen to flow into the thermal lance at a pressure greater than the surrounding water pressure.

2. The underwater tool of claim 1 characterized in that the seal at the end adjacent to the hand-held base portion is adapted to be opened by means of a needle (2) supported in said hand-held base portion, said needle displaceable in the longitudinal direction of the lance and preferably having an axial passage for the oxygen.

3. The underwater cutting tool of claim 2, characterized in that the needle is coupled to a trigger which is pivotably connected to the hand-held base portion such that upon movement of the trigger the needle will pierce the seal at the end adjacent the hand-held base portion.

4. The underwater cutting tool of claim 3 characterized in that an electrical switch for electrically igniting the igniter unit is provided.

5. The underwater cutting tool of claim 4, characterized in that the electrical switch is adapted to be actuated by means of a separate switch following the piercing of the seal (18) at the end adjacent the hand-held base portion.

6. The underwater cutting tool of claim 5, characterized in that the igniter unit comprises an electrical igniter having at least one heater filament sheathed by a firing substance, and in that the igniter thus constructed is adapted to be connected to the poles of a power source by the ignition switch disposed in the hand-held base portion.

7. The underwater cutting tool of claim 6, characterized in that the electrical ignited unit is fixed to the inside of the seal of the free end of the lance (10), the electrical connections of the igniter unit being passed to the ignition switch.

8. The underwater cutting tool of claim 7, characterized in that the ignited unit contains a material which is easily inflammable by a chemical reagent, the chemical reagent being adapted to be brought into contact with the firing substance as soon as oxygen has flown into the lance.

9. The underwater cutting tool of claim 8, characterized in that the chemical reagent is disposed in a thin glass bubble or the like at the inside of the seal closing the free end of the lance, the glass bubble breaking under the elevated pressure caused by the oxygen which flows into the lance, whereby the reagent contacts the firing substance provided at the respective location at the inside of the seal.

* * * * *